United States Patent
Kim et al.

(10) Patent No.: US 9,846,457 B2
(45) Date of Patent: Dec. 19, 2017

(54) HOUSING ASSEMBLY AND ELECTRONIC DEVICE THEREOF

(71) Applicant: Samsung Electronics Co., Ltd., Gyeonggi-do (KR)

(72) Inventors: Seong-Hyeon Kim, Gyeongsangbuk-do (KR); Jung-Bae Park, Daegu (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/695,943

(22) Filed: Apr. 24, 2015

(65) Prior Publication Data

US 2015/0313029 A1    Oct. 29, 2015

(30) Foreign Application Priority Data

Apr. 24, 2014 (KR) .......................... 10-2014-0049334

(51) Int. Cl.
*H05K 7/00* (2006.01)
*G06F 1/16* (2006.01)

(52) U.S. Cl.
CPC .......... *G06F 1/1656* (2013.01); *G06F 1/1633* (2013.01)

(58) Field of Classification Search
CPC ............................................. G02F 1/13
USPC ................................................. 361/679.21
See application file for complete search history.

(56) References Cited

U.S. PATENT DOCUMENTS 5,905,550 A  *  5/1999  Ohgami ............ G02F 1/133308
349/58

FOREIGN PATENT DOCUMENTS

KR           200444216          4/2009

* cited by examiner

*Primary Examiner* — Jerry Wu
(74) *Attorney, Agent, or Firm* — The Farrell Law Firm, P.C.

(57) ABSTRACT

A housing assembly structure is provided. The housing assembly structure includes a first housing, a second housing assembled with the first housing, a protrusion accommodating recess formed in the first housing, a hooking protrusion formed in the second housing to be accommodated in the protrusion accommodating recess in a protruding manner, and at least one contact protrusion formed in at least one area of the hooking protrusion in a protruding manner, wherein when the hooking protrusion is accommodated in the protrusion accommodating recess, the at least one contact protrusion is in contact with an inner surface of the protrusion accommodating recess.

10 Claims, 14 Drawing Sheets

HOUSING ASSEMBLY AND ELECTRONIC DEVICE THEREOF

PRIORITY

This application claims priority under 35 U.S.C. §119(a) to a Korean Patent Application, which was filed in the Korean Intellectual Property Office on Apr. 24, 2014 and assigned Serial No. 10-2014-0049334, the entire content of which is incorporated herein by reference.

BACKGROUND

1. Field of the Disclosure

The present disclosure generally relates to a housing assembly, and more particularly, to a housing assembly and an electronic device using the structure of the housing assembly.

2. Description of the Related Art

Instead of completing a product by using one housing, at least two housings may be assembled with each other to make one complete product. When the two housings are assembled, the two housings may form an exterior of the product, and a specific space may be formed so that various components (e.g., electronic components) including a substrate are placed thereon.

A device completed by assembling at least two housings with each other can improve reliability of the device when the device is formed with a structure in which the device can endure an external force (e.g., distortion or twist) and can be restored to an original shape when the external force is removed.

If at least two housings are assembled with each other, an inter-working assembly structure may be used. A plurality of protrusions may be formed in any one housing in a protruding manner with a specific interval, and a protrusion accommodating recess to which the protrusion can be mounted or inserted is formed in the remaining one housing. Thus, the two housings can be assembled with each other in such a manner that the protrusion is inserted to a corresponding protrusion accommodating recess, in such a housing assembly structure, a placement direction is determined to be a direction (e.g., a vertical direction) different from a direction in which the protrusion accommodating recess protrudes. Therefore, after the protrusion is inserted to the protrusion accommodating recess, mutual misalignment can be effectively avoided.

Conventionally, when the protrusion is mounted to the protrusion accommodating recess, a contact area of the protrusion contacts with a contact area of the protrusion accommodating recess, in this area contact case, when an external force (e.g., distortion or the like) is applied to a completely assembled device, a wide contact area formed by the protrusion and the protrusion accommodating recess produces a noise, which may lead to deterioration of device reliability. In order to solve such a problem, a lubrication agent (e.g., grease, etc.) is applied between the protrusion and the protrusion accommodating recess. However, applying the lubrication agent may lead to a problem in that manufacturing costs are increased. In addition, when an external force (e.g., distortion, etc.) is applied to the completely assembled device, dust may be generated due to mutual frictional forces caused by a wide contact area of the protrusion and the protrusion accommodating recess, and the dust may contaminate the inside of the device.

Further, since the protrusion and the protrusion accommodating recess are placed near the exterior of the device, the protrusion may be loosely fit to the protrusion accommodating recess due to an agglomeration of parting lines after post-processing (e.g., depositing, coating, etc.), which may lead to deterioration in the bonding force of the protrusion and the protrusion accommodating recess.

SUMMARY

The present disclosure has been made to solve at least the above-mentioned problems and/or disadvantages and to provide at least the advantages described below.

Accordingly, an aspect of the present disclosure is to provide a housing assembly structure for solving the above-mentioned problems and an electronic device using the structure.

Another aspect of the present disclosure is to provide a housing assembly structure in which a noise and a dust are not generated even if an external force (e.g., distortion) is applied, and an electronic device using the structure.

Another aspect of the present disclosure is to provide a housing assembly structure in which manufacturing costs can be reduced by simply changing a structure when a housing is injection molded, and an electronic device using the structure.

Another aspect of the present disclosure is to provide a housing assembly structure implemented to prevent bonding force deterioration caused by loose fitting or the like which occurs in post-processing of a housing, and an electronic device using the structure.

According to an aspect of the present disclosure, a housing assembly is provided, which includes a first housing, a second housing assembled with the first housing, a protrusion accommodating recess formed in the first housing, a hooking protrusion formed in the second housing to be accommodated in the protrusion accommodating recess in a protruding manner, and at least one contact protrusion formed in at least one area of the hooking protrusion in a protruding manner, wherein when the hooking protrusion is accommodated in the protrusion accommodating recess, the at least one contact protrusion is in contact with an inner surface of the protrusion accommodating recess.

According to another aspect of the present disclosure, an electronic device is provided, which includes a front housing applied to an exterior of the electronic device, a rear housing applied to the exterior of the electronic device and assembled with the from housing, a plurality of protrusion accommodating recesses formed in an assembling area with respect to the rear housing with a specific interval around an edge of the front housing, a hooking protrusion formed in the assembling area with respect to the from housing around an edge of the rear housing to be accommodated in the plurality of protrusion accommodating recesses, and at least one contact protrusion formed in at least one area of the hooking protrusion in a protruding manner, wherein when the hooking protrusion is accommodated in the plurality of protrusion accommodating recesses, the at least one contact protrusion is in contact with an inner surface of the plurality of protrusion accommodating recesses.

According to another aspect of the present disclosure, a housing assembly is provided, which includes a first housing, a second housing assembled with the first housing, a protrusion accommodating recess formed in the first housing, a hooking protrusion formed in the second housing to be accommodated in the protrusion accommodating recess in a protruding manner, and at least one contact protrusion formed in at least one inner surface of the hooking protrusion in a protruding manner, wherein when the hooking protrusion is accommodated in the protrusion accommodating recess, the at least one contact protrusion is in contact with an outer surface of the protrusion accommodating recess.

According to another aspect of the present disclosure, an electronic device is provided, which includes a front housing applied to an exterior of the electronic device, a rear housing applied to the exterior of the electronic device and assembled with the front housing, a plurality of protrusion accommodating recesses formed in an assembling area with respect to the rear housing with a specific interval around an edge of the front housing, a hooking protrusion formed in the assembling area with respect to the front housing around an edge of the rear housing to be accommodated in the plurality of protrusion accommodating recesses, and at least one contact protrusion formed in at least one inner surface of the hooking protrusion in a protruding manner, wherein when the hooking protrusion is accommodated in the plurality of protrusion accommodating recesses, the at least one contact protrusion is in contact with an outer surface of the plurality of protrusion accommodating recesses.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
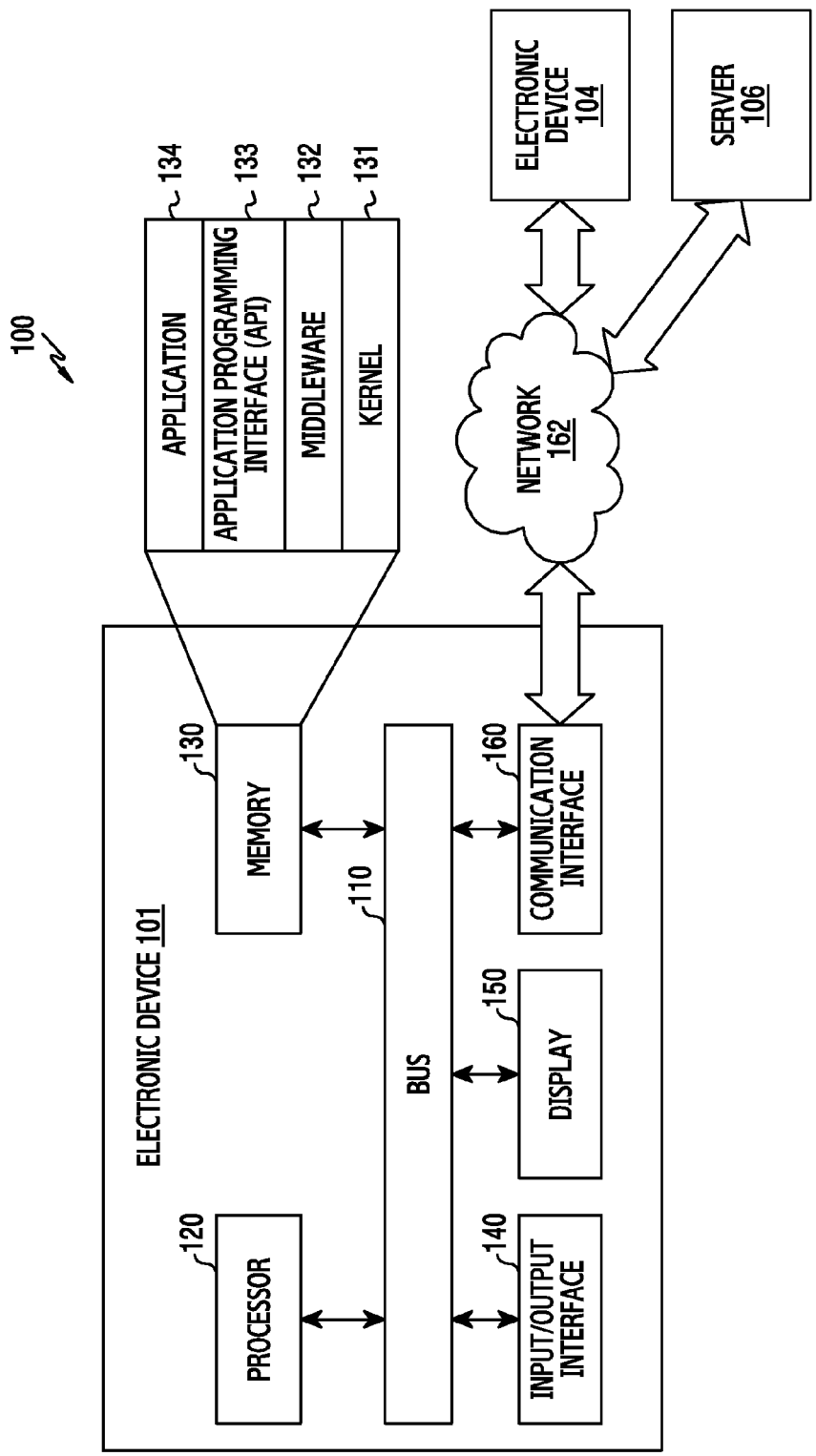
FIG. 1 illustrates a network environment including an electronic device according to an embodiment of the present disclosure.

FIGS. 1 through 8, discussed below, and the various embodiments used to describe the principles of the present disclosure in this specification are by way of illustration only and should not be construed in any way to limit the scope of the present disclosure. Those skilled in the art will understand that the principles of the present disclosure may be implemented in any suitably arranged system and method. Hereinafter, the present disclosure is described with reference to the accompanying drawings. While the present disclosure is susceptible to various modifications and alternative forms, a specific embodiment thereof has been shown by way of examples in the drawings and will herein be described in detail. It should be understood, however, that it is not intended to limit the present disclosure to the particular form disclosed, but, alternatively, it is intended that the present disclosure covers all modifications, equivalents, and alternatives falling within the spirit and scope of the present disclosure as defined by the appended claims. Like reference numerals denote like constitutional elements throughout the drawings.

The expressions "include" or "may include" used in the present disclosure are intended to indicate a presence of a corresponding function, operation, or constitutional element, and it is not intended to limit a presence of one or more functions, operations, or constitutional elements. In addition, in the present disclosure, the terms "include" or "have" are intended to indicate that characteristics, numbers, steps, operations, constitutional elements, and components disclosed in the specification or combinations thereof exist. As such, the terms "include" or "have" should be understood that there are additional possibilities of one or more other characteristics, numbers, steps, operations, constitutional elements, elements or combinations thereof.

In the present disclosure, the expression "or" includes any and all combinations of words enumerated together. For example, "A or B" may include A or B, or may include both A and B.

Although expressions such as "$1^{st}$", "$2^{nd}$", "first", and "second" may be used to express various constitutional elements of the present disclosure, it is not intended to limit the corresponding constitutional elements. For example, the above expressions are not intended to limit an order or an importance of the corresponding constitutional elements. The above expressions may be used to distinguish one constitutional element from another constitutional element. For example, a $1^{st}$ user device and a $2^{nd}$ user device are both user devices, and indicate different user devices. For example, a $1^{st}$ constitutional element may be referred to as a $2^{nd}$ constitutional element, and similarly, the $2^{nd}$ constitutional element may be referred to as the $1^{st}$ constitutional element without departing from the scope of the present disclosure.

When a constitutional element is mentioned as being "connected" to or "accessing" another constitutional element, this may mean that it is directly connected to or accessing the other constitutional element, but may also be understood that there are intervening constitutional elements present. Alternatively, when a constitutional element is mentioned as being "directly connected" to or "directly accessing" another constitutional element, it is to be understood that there are no intervening constitutional elements present.

The terminology used in the present disclosure is for the purpose of describing particular embodiments only and is not intended to limit the present disclosure. A singular expression includes a plural expression unless there is a contextually distinctive difference therebetween.

The term "module" used in the present disclosure may imply a unit including, for example, one of hardware, software, and firmware or a combination of two or more of them. The term "module" may be interchangeably used with terms such as "unit", "logic", "logical block", "component", "circuit", and the like. The "module" may be a minimum unit of an integrally constituted component or may be a part thereof. The "module" may be a minimum unit for performing one or more functions or may be a part thereof. The "module" may be mechanically or electrically implemented. For example, the "module" of the present disclosure may include at least one of an Application-Specific Integrated Circuit (ASIC) chip, a Field-Programmable Gate Arrays (FPGAs), and a programmable-logic device, which are known or will be developed and which perform certain operations.

Unless otherwise defined, all terms (including technical and scientific terms) used herein have the same meaning as commonly understood by those ordinarily skilled in the art to which the present disclosure belongs. It will be further understood that terms, such as those defined in commonly used dictionaries, should be interpreted as having a meaning that is consistent with their meanings in the context of the relevant art and the present disclosure, and will not be interpreted in an idealized or overly formal sense unless expressly so defined herein.

An electronic device according to the present disclosure may be a device including a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a MPEG-1 Audio Layer 3 (MP3) player, a mobile medical device, a camera, and a wearable device (e.g., a Head-Mounted-Device (HMD) such as electronic glasses, electronic clothes, an electronic bracelet, an electronic necklace, an electronic appcessory, an electronic tattoo, or a smart watch).

According to certain embodiments of the present disclosure, the electronic device may be a smart home appliance having a communication function. For example, the smart home appliance may include at least one of a TeleVision (TV), a Digital Video Disk (DVD) player, an audio, a refrigerator, an air conditioner, a cleaner, an oven, a microwave oven, a washing machine, an air purifier, a set-top box, a TV box (e.g., Samsung HomeSync™, Apple TV™, or Google TV™), a game console, an electronic dictionary, an electronic key, a camcorder, and an electronic picture frame.

According to certain embodiments of the present disclosure, the electronic device may include at least one of various medical devices (e.g., Magnetic Resonance Angiography (MRA), Magnetic Resonance Imaging (MRI), Computed Tomography (CT), imaging equipment, ultrasonic instrument, and the like), a navigation device, a Global Positioning System (UPS) receiver, an Event Data Recorder (EDR), a Flight Data Recorder (FDR), a car infotainment device, an electronic equipment for ship (e.g., a vessel navigation device, a gyro compass, and the like), avionics, a security device, and an industrial or domestic robot.

According to certain embodiments of the present disclosure, the electronic device may include at least one of furniture or a part of building/constructions including a screen output function, an electronic board, an electronic signature receiving device, a projector, and various measurement machines (e.g., water supply, electricity, gas, propagation measurement machine, and the like). The electronic device according to the present disclosure may be one or more combinations of the aforementioned various devices. In addition, it is apparent those ordinarily skilled in the art that the electronic device according to the present disclosure is not limited to the aforementioned devices.

According to an embodiment of the present disclosure, the electronic device may include a plurality of displays capable of a screen output, and may output one screen by using the plurality of displays as one display or may output a screen to each display. According to an embodiment of the present disclosure, the plurality of displays may be connected with a connection portion, for example, a hinge, to be movable in a specific angle according to a fold-in or fold-out manner.

According to another embodiment of the present disclosure, the electronic device may include a flexible display, and may output a screen by using the flexible display as one display or by dividing a display area into a plurality of parts with respect to a portion of the flexible display.

According to another embodiment of the present disclosure, the electronic device may be equipped with a cover having a display protection function capable of a screen output. According to an embodiment of the present disclosure, the electronic device may output one screen by using a display of the cover and a display of the electronic device as one display or may output a screen to each display.

Hereinafter, an electronic device according to various embodiments of the present disclosure will be described with reference to the accompanying drawings. The term 'user' used in the various embodiments of the present disclosure may refer to a person who uses the electronic device or a device (e.g., an Artificial Intelligence (AI) electronic device) which uses the electronic device.

FIG. 1 illustrates a network environment 100 including an electronic device 101 according to an embodiment of the present disclosure. Referring to FIG. 1, the electronic device 101 may include a bus 110, a processor 120, a memory 130, an input/output interface 140, a display 150, and a communication interface 160.

The bus 110 is a circuit for connecting the aforementioned constitutional elements to each other and for delivering communication (e.g., a control message) between the aforementioned constitutional elements.

The processor 120 receives an instruction from the aforementioned different constitutional elements (e.g., the memory 130, the input/output interface 140, the display 150, the communication interface 160), for example, via the bus 110, and thus interprets the received instruction and executes arithmetic or data processing according to the interpreted instruction.

The memory 130 stores an instruction or data received from the processor 120 or different constitutional elements (e.g., the input/output interface 140, the display 150, the communication interface 160) or generated by the processor 120 or the different constitutional elements. The memory 130 may include programming modules such as a kernel 131, a middleware 132, an Application Programming Interface (API) 133, an application 134, and the like. Each of the aforementioned programming modules may consist of software, firmware, or hardware entities or may consist of at least two or more combinations thereof.

The kernel 131 controls or manages the remaining other programming modules, for example, system resources (e.g., the bus 110, the processor 120, the memory 130, and the like) used to execute an operation or function implemented in the middleware 132, the API 133, or the application 134. In addition, the kernel 131 provides a controllable or manageable interface by accessing individual constitutional elements of the electronic device 101 in the middleware 132, the API 133, or the application 134.

The middleware 132 performs a mediation role such that the API 133 or the application 134 communicates with the kernel 131 to exchange data. In addition, regarding task requests received from the application 134, for example, the middleware 132 may perform a control (e.g., scheduling or load balancing) for the task requests by using a method of assigning a priority capable of using a system resource (e.g., the bus 110, the processor 120, the memory 130, and the like) of the electronic device 101 to at least one of the applications 134.

The API 133 may include at least one interface or function (e.g., instruction) for the control, window control, video processing, character control, and the like, as an interface capable of controlling a function provided by the application 134 in the kernel 131 or the middleware 132.

According to an embodiment of the present disclosure, the application 134 may include a Short Message Service (SMS)/Multimedia Messaging Service (MMS) application, an e-mail application, a calendar application, an alarm application, a health care application (e.g., an application for measuring a physical activity level, a blood sugar, and the like) or an environment information application (e.g., atmospheric pressure, humidity, or temperature information). Alternatively, the application 134 may be an application related to an information exchange between the electronic device 101 and an external electronic device 104. The application related to the information exchange may include, for example, a notification relay application for relaying specific information to the external electronic device or a device management application for managing the external electronic device.

For example, the notification relay application may include a function of relaying notification information generated in another application (e.g., an SMS/MMS application, an e-mail application, a health care application, an environment information application, and the like) of the electronic device 101 to the external electronic device 104. Alternatively, the notification relay application may receive notification information, for example, from the external electronic device 104 and may provide it to the user. The device management application may manage, for example, a function for at least one part of the external electronic device 104 which communicates with the electronic device 101. Examples of the function include turning on/turning off the external electronic device itself (or some components thereof) or adjusting a display illumination (or a resolution), and managing (e.g., installing, deleting, or updating) an application which operates in the external electronic device or a service (e.g., a call service or a message service) provided by the external electronic device.

According to an embodiment of the present disclosure, the application 134 may include an application specified according to attribute information (e.g., an electronic device type) of the external electronic device 104. For example, if the external electronic device is an MP3 player, the application 134 may include an application related to a music play. Similarly, if the external electronic device is a mobile medical device, the application 134 may include an application related to a health care. According to an embodiment of the present disclosure, the application 134 may include at least one of a specified application in the electronic device 101 or an application received from a server 106 or the external electronic device 104.

The input/output interface 140 relays an instruction or data input from a user via an input/output device (e.g., a sensor, a keyboard, or a touch screen) to the processor 120, the memory 130, the communication interface 160, for example, via the bus 110. For example, the input/output interface 140 may provide data regarding a user's touch input via the touch screen to the processor 120. In addition, the input/output interface 140 outputs an instruction or data received from the processor 120, the memory 130, the communication interface 160 to an output device (e.g., a speaker or a display), for example, via the bus 110. For example, the input/output interface 140 may output audio data provided by using the processor 120 to the user via the speaker.

The display 150 displays a variety of information (e.g., multimedia data or text data) to the user.

The communication interface 160 connects a communication between the electronic device 101 and an external device (e.g., the external electronic device 104, or the server 106). For example, the communication interface 160 may communicate with the external device by being connected with a network 162 through the wireless communication or wired communication. For example, the wireless communication may include at least one of Wireless Fidelity (Wi-Fi), Bluetooth (BT), Near Field Communication (NFC), a Global Positioning System (GPS), and cellular communication (e.g., Long Term Evolution (LTE), LTE-Advanced (LIE-A), Code Division Multiple Access (CDMA), Wideband CDMA (WCDMA), Universal Mobile Telecommunications System (UMTS), Wireless Broadband (WiBro), Global System for Mobile Communications (GSM), and the like). For example, the wired communication may include at least one of Universal Serial Bus (USB), High Definition Multimedia Interface (HDMI), Recommended Standard (RS)-232, and Plain Old Telephone Service (POTS).

According to an embodiment of the present disclosure, the network 162 may be a telecommunications network. The telecommunications network may include at least one of a computer network, an internet, an internet of things, and a telephone network. According to an embodiment of the present disclosure, a protocol (e.g., a transport layer protocol, a data link layer protocol, or a physical layer protocol) for a communication between the electronic device 101 and the external device may be supported in at least one of the application 134, the API 133, the middleware 132, the kernel 131, and the communication interface 160.

Although an electronic device having an assembly structure between two housings is illustrated and explained in the description of various embodiments of the present disclosure, the present disclosure may also be applied to an electronic device having an assembly structure among three or more housings.

Although an electronic device is illustrated and an assembly structure of two housings which form an exterior of the electronic device is explained in the description of various embodiments of the present disclosure, the present disclosure is not limited thereto. For example, the present disclosure may be applied to various devices other than the electronic device, and may also be applied to an assembly structure between housings used as a part of an external or internal constitutional element other than the exterior of the device.

Figure 2:
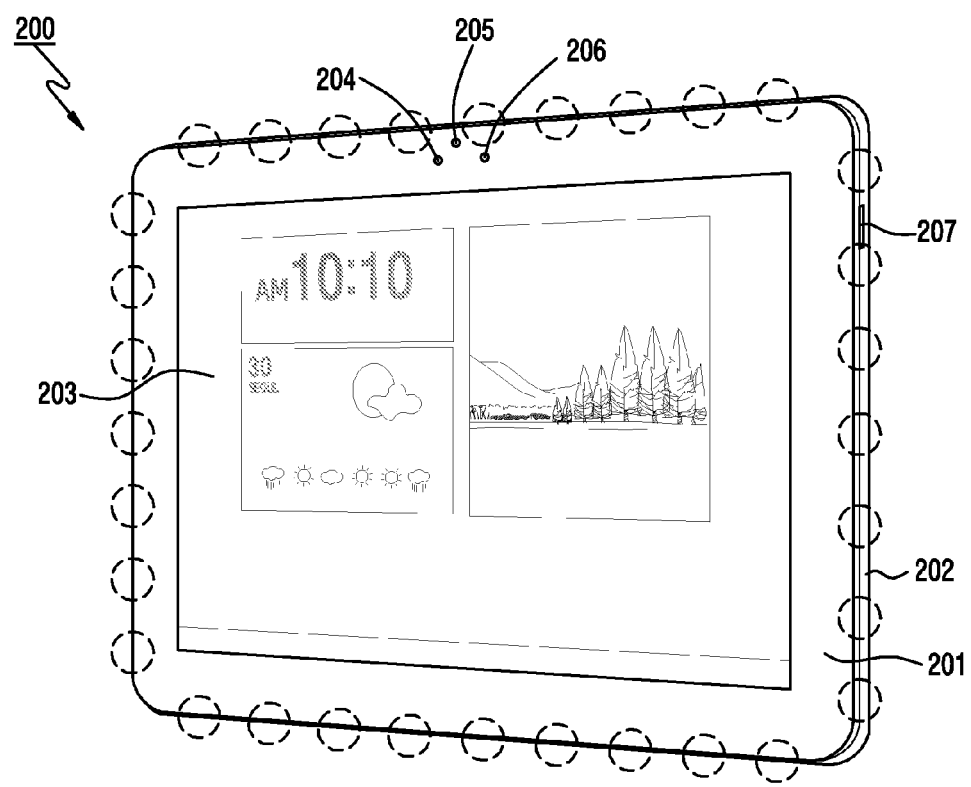
FIG. 2 is a perspective view of an electronic device according to an embodiment of the present disclosure.

FIG. 2 is a perspective view of an electronic device 200 according to an embodiment of the present disclosure.

Referring to FIG. 2, a first housing 201 and a second housing 202 are assembled to form an external of the electronic device 200. According to an embodiment of the present disclosure, the first housing 201 may be served as a front surface housing, and the second housing 202 may be served as a rear surface housing.

According to an embodiment of the present disclosure, the electronic device 200 may include a display device 203 in the front surface thereof. The display device 203 may be a touch screen device. According to an embodiment of the present disclosure, at least one microphone device 204 may be placed in an upper portion of the electronic device 200, and at least one speaker device 207 may be placed in a lateral portion of the electronic device 200. However, the microphone device 204 and the speaker device 207 may be placed to any other locations, instead of the illustrated locations of the electronic device 200.

According to an embodiment of the present disclosure, a camera device 205 may be placed in the front surface of the electronic device 200, and at least one sensor module 206 may be placed as a sensing means for controlling the electronic device 200 on the basis of a surrounding environment. The sensor module 206 may be various sensors such as an illustration sensor for controlling brightness of the display module by sensing an ambient illumination, a proximity sensor for controlling activation of the display device 203 by sensing that the electronic device 200 approaches a face of a user, and the like.

According to an embodiment of the present disclosure, the electronic device 200 may perform a communication function. For example, in addition to a typical telephone function, near distance communication may be performed by using a near-field communication module such as a BT module, a WiFi module, or the like.

According to an embodiment of the present disclosure, the first housing 201 and the second housing 202 of the electronic device 200 may be assembled by using a concave-convex structure of a protrusion accommodating recess (see 2013 of FIG. 3A) and a hooking protrusion (see 2022 of FIG. 3B) to be accommodated to the protrusion accommodating recess. As described below, the plurality of protrusion accommodating recesses 2013 may be formed with a specific interval around an internal edge of the first housing 201, and the plurality of hooking protrusions 2022 to be accommodated to the protrusion containing recesses 2013 may be formed around an internal edge of the second housing 202 at corresponding locations in a protruding manner. Therefore, if the first housing 201 is coupled to the second housing 202, they may be coupled in such a manner that the protrusion 2022 of the second housing 202 is mounted to the protrusion accommodating recess 2013 of the first housing 201. According to an embodiment of the present disclosure, a direction of assembling the first housing 201 and the second housing 202 may be configured as a direction (e.g., a z-axis direction of FIG. 3A, etc.) different from a direction (i.e., an x-axis direction of FIG. 3A) in which the hooking protrusion 2022 is mounted to the protrusion accommodating recess 2013, and thus after the hooking protrusion 2022 is mounted to the protrusion accommodating recess 2013, the structure has a hooking function. Therefore, the bonding force is maximized between the hooking protrusion 2022 and the protrusion accommodating recess 2013.

According to an embodiment of the present disclosure, the aforementioned bonding structure of the hooking protrusion 2022 and the protrusion accommodating recess 2013 may be placed in a plurality of circular portions indicated by a dotted line around an edge of the electronic device of FIG. 2.

Figure 3A:
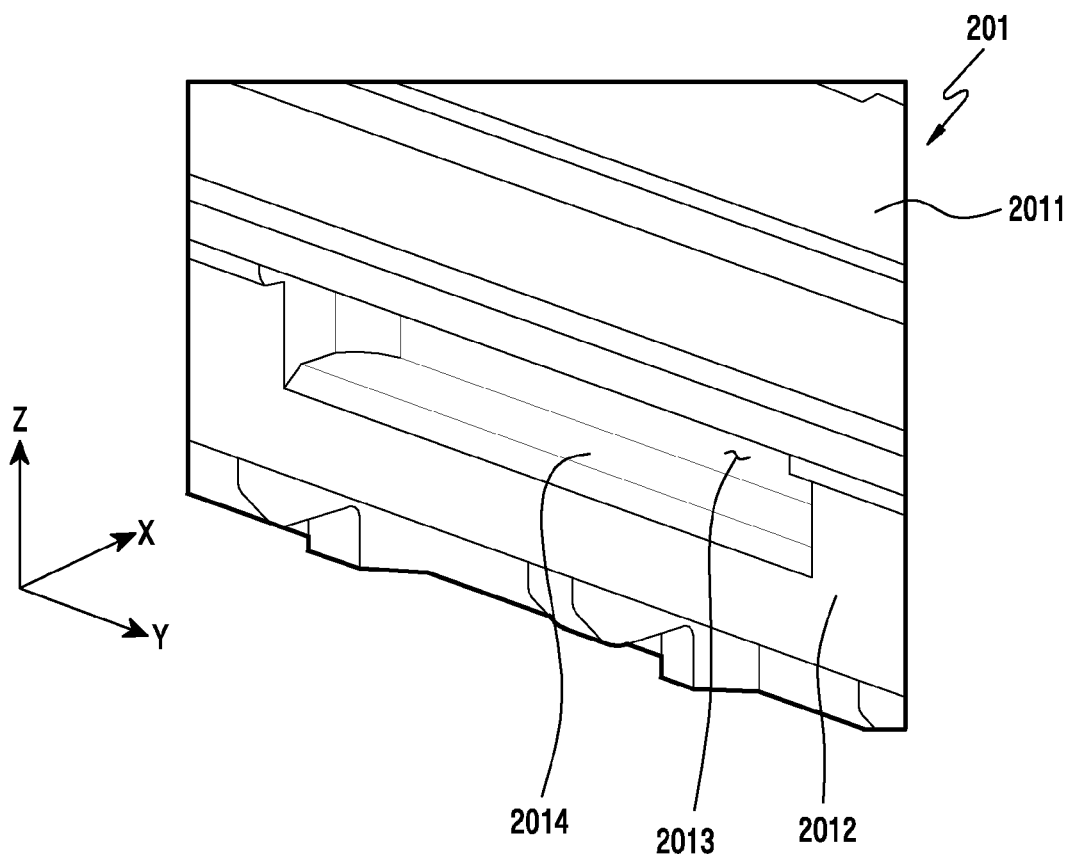
FIG. 3A is a perspective view illustrating important parts of a first housing according to an embodiment of the present disclosure.
Figure 3B:
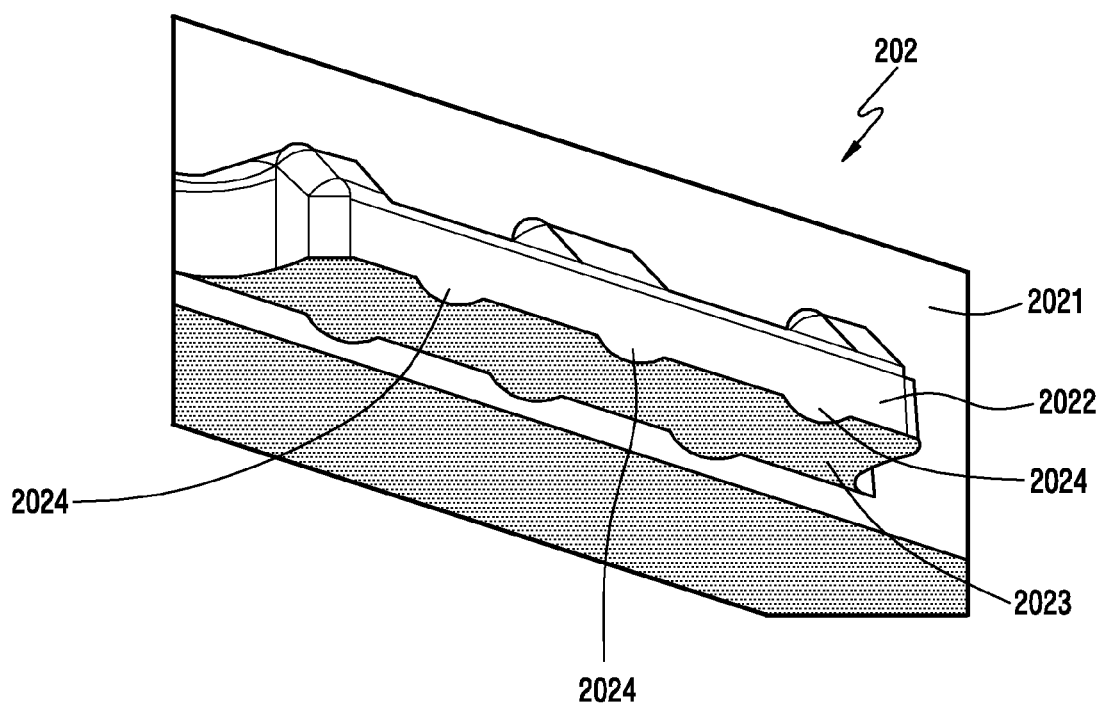
FIG. 3B is a perspective view illustrating important parts of a second housing according to an embodiment of the present disclosure.

FIG. 3A is a perspective view illustrating important parts of the first housing 201 according to an embodiment of the present disclosure. FIG. 3B is a perspective view illustrating important parts of the second housing 202 according to an embodiment of the present disclosure.

Referring to FIG. 3A and FIG. 3B, the first housing 201 includes an upper surface 2011 which forms the exterior of the electronic device 200 and a first assembling area 2012 extended from the upper surface 2011 and in contact with a second assembling area 2021 of the second housing 202. When the first housing 201 and the second housing 202 are assembled, the first assembling area 2012 and the second assembling area 2021 are in contact with each other, but are not exposed as the exterior of the electronic device 200.

According to an embodiment of the present disclosure, the internally-concave protrusion accommodating recess 2013 may be formed in the first assembling area 2012 in a direction (e.g., an x-axis direction) in which a hooking protrusion 2022 of the second housing 202 is placed. According to an embodiment of the present disclosure, the protrusion accommodating recess 2013 may be formed with a depth sufficient to accommodate the hooking protrusion 2022. According to an embodiment of the present disclosure, a first contact area 2014 may be formed in the protrusion accommodating recess 2013. The first contact area 2014 may be partially in contact with a second contact area 2023, which may be formed in the hooking protrusion 2022, of the second housing 202.

According to an embodiment of the present disclosure, when the second housing 202 is assembled with the first housing 201, the second assembling area 2021 of the second housing 202 is matched to the first assembling area 2012 of the first housing 201. According to an embodiment of the present disclosure, the hooking protrusion 2022 may be formed in the second assembling area 2021 in a protruding manner. According to an embodiment of the present disclosure, the hooking protrusion 2022 may be formed in the second contact area 2023 at a location corresponding to the first contact area 2014 of the first housing 201.

According to an embodiment of the present disclosure, a contact protrusion 2024 may be formed in the second contact area 2023 in a protruding manner with a specific interval. The contact protrusion 2024 may be formed to have a curved shape in which an end portion thereof is curved, and may be formed to have a length in a placement direction (e.g., an x-axis direction of FIG. 3A). However, the present disclosure is not limited thereto, and thus the contact protrusion 2024 may also be formed with an irregular interval. Various shapes of the contact protrusion 2024 will be described below.

Figure 4:
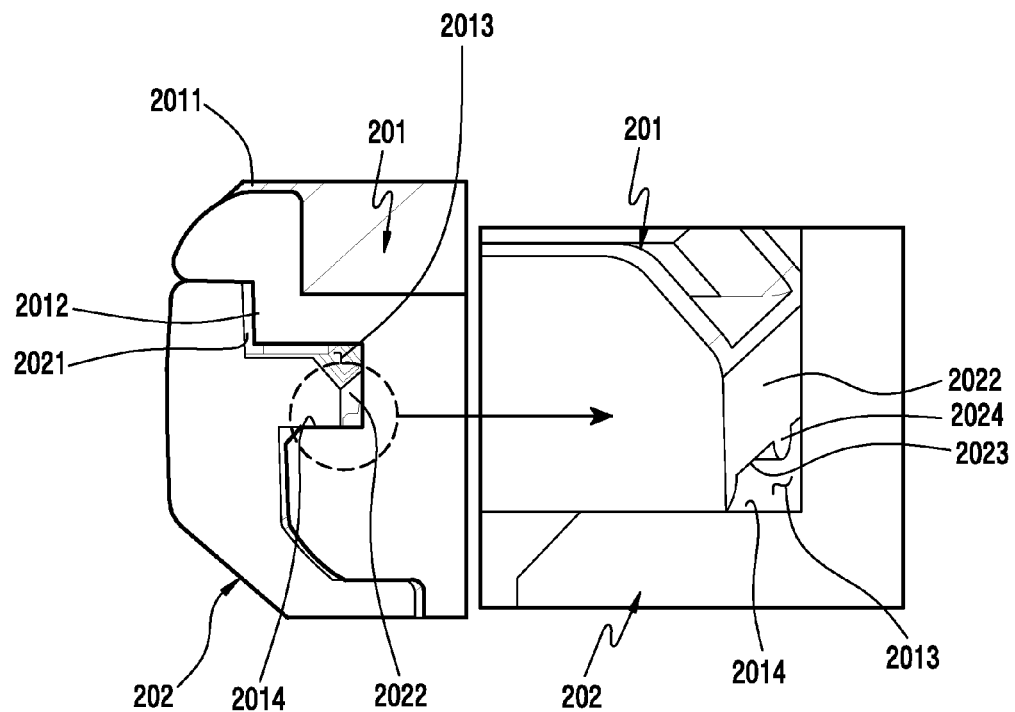
FIG. 4 illustrates a state in which a first housing and a second housing are assembled according to an embodiment of the present disclosure.

FIG. 4 illustrates a state in which the first housing 201 and the second housing 202 are assembled according to an embodiment of the present disclosure.

The left part of FIG. 4 is a cross-sectional view of the state in which the first housing 201 and the second housing 202 are assembled, and the right part of FIG. 4 is an enlarged view of the dotted circle area in the left part of FIG. 4. Referring to FIG. 4, if the first housing 201 is assembled with the second housing 202, the hooking protrusion 2022 of the second housing 202 is mounted to the protrusion accommodating recess 2013 of the first housing 201. According to an embodiment of the present disclosure, if the hooking protrusion 2022 is mounted to the protrusion accommodating recess 2013, the first assembling area 2012 of the first housing 201 may be in contact with the second assembling area 2021 of the second housing 202. According to an embodiment of the present disclosure, the second contact area 2023 of the hooking protrusion 2022 of the second housing 202 may be placed to face the first contact area 2014 of the protrusion accommodating recess 2013 of the first housing 202. However, an area contact is not achieved between the first contact area 2014 and the second contact area 2023, and only an end portion of the contact protrusion 2024 formed in the second contact area 2023 in a protruding manner may be in contact with the first contact area 2014.

According to an embodiment of the present disclosure, an area in which the second contact area 2023 of the hooking protrusion 2022 is in contact with the first contact area 2014 of the protrusion accommodating recess 2013 (if possible, a line contact or a point contact is preferable) is minimized. Therefore, after the assembly, when an external force (e.g., distortion, etc.) applied to the electronic device 200 leads to deformation, a noise generated by the excessive friction force of an area contact can be prevented, and the generation of dust can be restrained.

According to an embodiment of the present disclosure, a mutual contact potion in the hooking protrusion 2022 and the protrusion accommodating recess 2013 is described and explained as one part, but the present disclosure is not limited thereto. For example, the hooking protrusion 2022 may be formed in a plurality of contact areas in which an outer surface of the hooking protrusion 2022 is in contact with an inner surface of the protrusion accommodating recess 2013.

According to an embodiment of the present disclosure, the protrusion accommodating recess 2013 is formed in the first housing 201, and the hooking protrusion 2022 is formed in the second housing 202. However, it is also possible that the protrusion accommodating recess 2013 is formed in the second housing 202, and the hooking protrusion 2022 is formed in the first housing 201.

According to an embodiment of the present disclosure, the protrusion accommodating recess 2013 and the hooking protrusion 2022 are alternately formed on the first housing 201, and it is also possible that the hooking protrusion 2022 and the protrusion accommodating recess 2013 are alternately formed at corresponding locations on the second housing 202.

Figure 5:
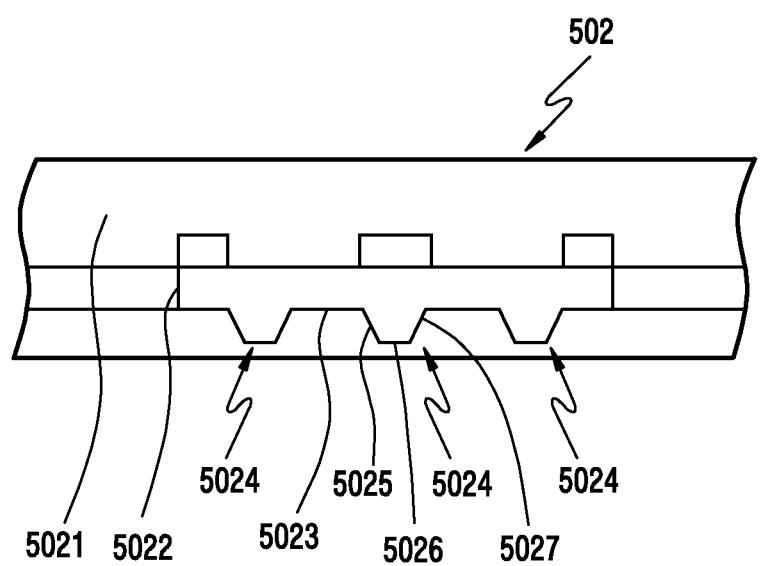
FIG. 5 is a front view of a second housing according to an embodiment of the present disclosure.

FIG. 5 is a front view of a second housing 502 according to an embodiment of the present disclosure. Although not shown in FIG. 5, a configuration of the first housing 201 is the same as that shown in FIG. 3A, and a structure of assembling the first housing 201 with the second housing 502 is also the same as described above. Therefore, a description thereof will be omitted.

Referring to FIG. 5, a hooking protrusion 5022 is formed to a second assembling area 5021 of the second housing 502 in a protruding manner, and a plurality of contact protrusions 5024 are formed in a second contact area 5023 of the hooking protrusion 5022 in a protruding manner. In this case, the contact protrusion 5024 is formed such that a contact portion of the contact protrusion 5024 with respect to the first housing 201 is formed as a planar surface, unlike the contact protrusion 2024 of FIG. 3B. According to an embodiment of the present disclosure, the contact protrusion 5024 may be formed including inclination portions 5025 and 5027 which are outwardly inclined in both directions and meet at a planar portion 5026 to improve the supporting force.

Accordingly, the contact protrusion 5024 may include the first inclination portion 5025 formed in a direction of protruding from the second contact area 5023, a planar portion 5026 formed in parallel with the second contact area 5023, and the second inclination portion 5027 formed in an inclination manner in a direction of protruding from the second contact area 5023. The first inclination portion 5025 and the second inclination portion 5027 meet at the planar portion 5026. According to an embodiment of the present disclosure, a cross-section of the contact protrusion 5024 may be formed in a trapezoidal shape. According to an embodiment of the present disclosure, the planar portion 5026 may be designed to have a proper length by considering a size, assembly relation, or the like of the electronic device 200 in an initial design.

Figure 6A:
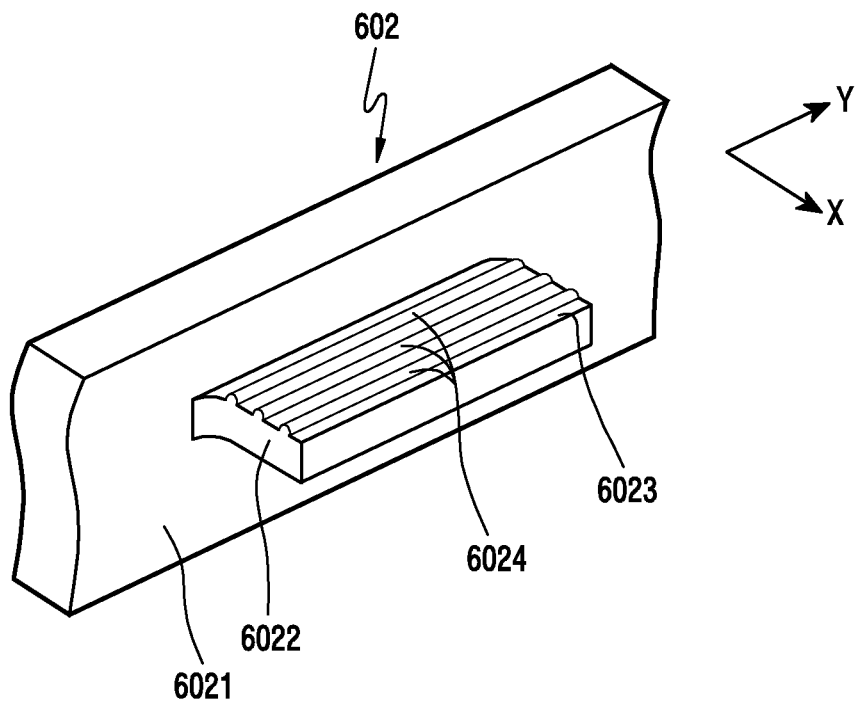
FIG. 6A is a perspective view illustrating important parts of a second housing according to an embodiment of the present disclosure.
Figure 6B:
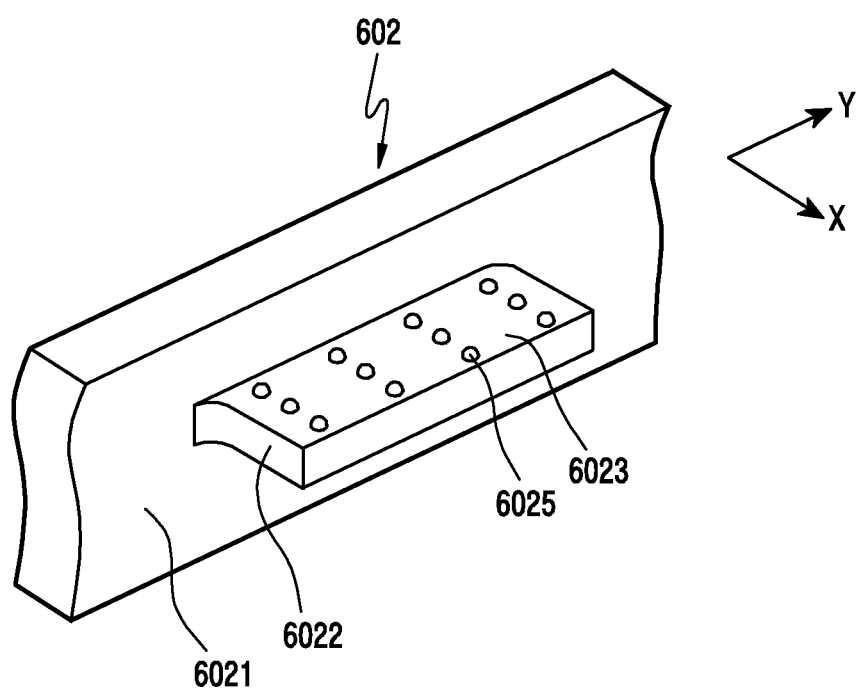
FIG. 6B is a perspective view illustrating important parts of a second housing according to an embodiment of the present disclosure.

FIG. 6A is a perspective view illustrating important parts of a second housing 602 according to an embodiment of the present disclosure. FIG. 6B is a perspective view illustrating important parts of the second housing 602 according to an embodiment of the present disclosure.

Although not shown in FIG. 6A and FIG. 6B, a configuration of the first housing 201 is the same as that shown in FIG. 3A, and a structure of assembling the first housing 201 with the second housing 602 is also the same as described above. Therefore, a description thereof will be omitted.

Referring to FIG. 6A, a hooking protrusion 6022 is formed in a second assembling area 6021 of the second housing 602 in a protruding manner. According to an embodiment of the present disclosure, a plurality of contact protrusions 6024 may be formed in a second contact area 6023 of the hooking protrusion 6022 with a specific interval in a protruding manner. According to an embodiment of the present disclosure, the contact protrusion 6024 may be formed in a direction (i.e., a y-axis direction) orthogonal to a direction (i.e., an x-axis direction) of placing the hooking protrusion 6022.

Referring to FIG. 6B, the hooking protrusion 6022 is formed in the second assembling area 6021 of the second housing 602 in a protruding manner. According to an embodiment of the present disclosure, the plurality of contact protrusions 6025 may be formed in the second contact area 6023 of the hooking protrusion 602 in a protruding manner with a specific interval. According to an embodiment, a plurality of contact protrusions 6025 may be formed in the second contact area 6023 through an embossing process in a protruding manner with a specific interval.

Figure 6C:
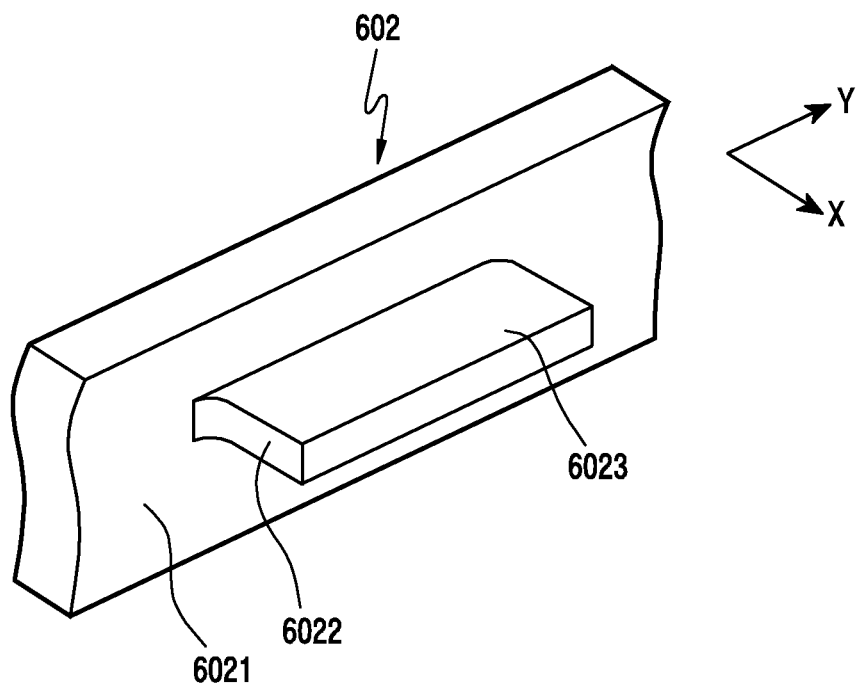
FIG. 6C and FIG. 6D are perspective views illustrating important parts of a first housing and a second housing assembled with the first housing according to an embodiment of the present disclosure.
Figure 6D:
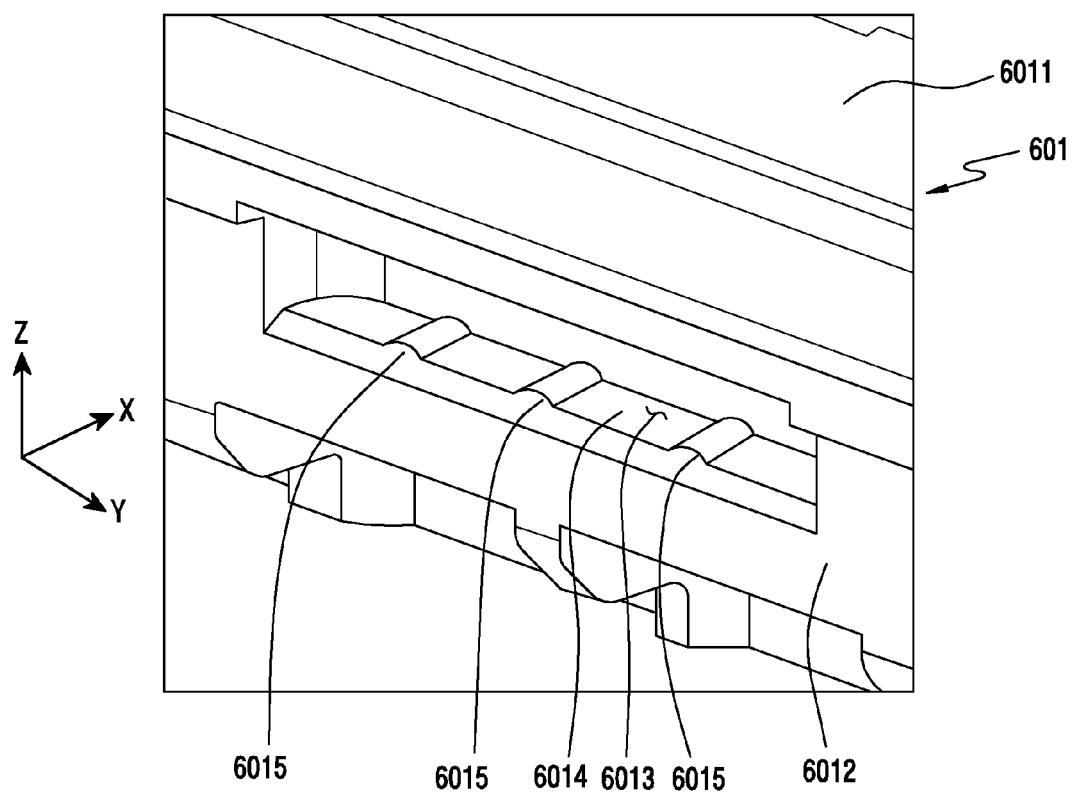

FIG. 6C and FIG. 6D are perspective views illustrating important parts of a first housing and a second housing assembled with the first housing according to an embodiment of the present disclosure.

Referring to FIG. 6C, the hooking protrusion 6022 is formed in the second assembling area 6021 of the second housing 602 in a protruding manner. According to an embodiment of the present disclosure, the second contact area 6023 of the hooking protrusion 6022 is not formed with any contact protrusion, and may maintain a shape of a planar surface. According to an embodiment of the present disclosure, the hooking protrusion 6022 may be applied in a manner of inserting in a protrusion accommodating recess 6013 of a first housing 610 in an x-axis direction.

Referring to FIG. 6D, the first housing 601 includes an upper surface 6011 which forms the exterior of the electronic device 200 and a first assembling area 6012 extended from the upper surface 6011 and in contact with the second assembling area 6021 of the second housing 602. When the first housing 601 and the second housing 602 are assembled, the first assembling area 6012 and the second assembling area 6021 are in contact with each other, but are not exposed as the exterior of the electronic device 200.

According to an embodiment of the present disclosure, the concave protrusion accommodating recess 6013 may be formed in the first assembling area 6012 in a direction (e.g., an x-axis direction) in which the hooking protrusion 6022 is placed. According to an embodiment of the present disclosure, the protrusion accommodating recess 6013 may be formed with a depth sufficient to accommodate the hooking protrusion 6022. According to an embodiment of the present disclosure, at least one contact protrusion 6015 may be formed in at least one first contact area 6014 of the protrusion accommodating recess 6013 in a protruding manner.

According to an embodiment of the present disclosure, when the second housing 602 is assembled with the first housing 601, the hooking protrusion 6022 may be accommodated to the protrusion accommodating recess 6013 in a mounting manner, and the contact protrusion 6015 formed in the first contact area 6014 of the protrusion accommodating recess 6013 in a protruding manner may be assembled with the second contact area 6023 of the hooking protrusion 6022 in a contact manner.

Figure 7A:
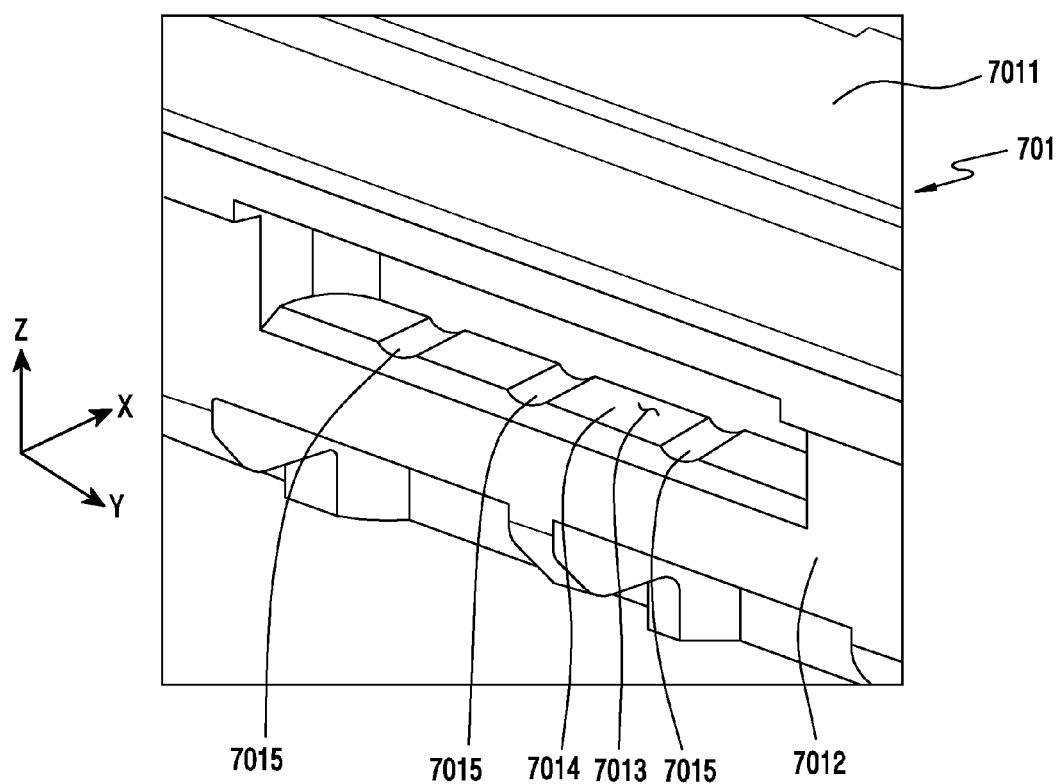
FIG. 7A is a perspective view illustrating important parts of a first housing according to an embodiment of the present disclosure.
Figure 7B:
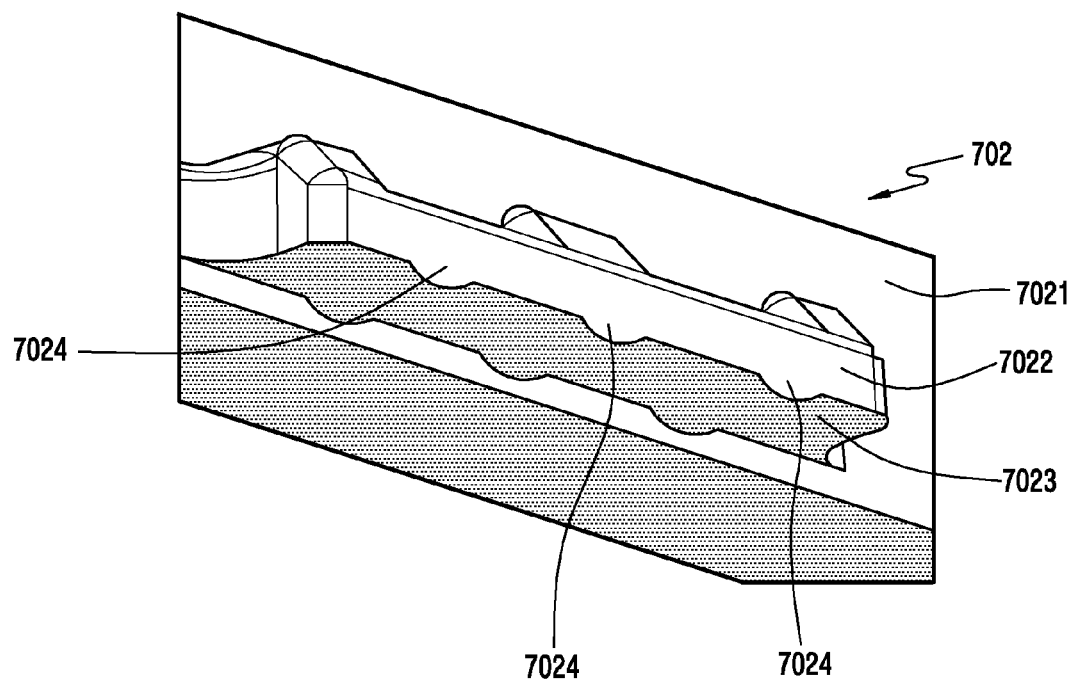
FIG. 7B is a perspective view illustrating important parts of a second housing according to an embodiment of the present disclosure.

FIG. 7A is a perspective view illustrating important parts of a first housing according to an embodiment of the present disclosure. FIG. 7B is a perspective view illustrating important parts of a second housing according to an embodiment of the present disclosure.

Referring to FIG. 7A and FIG. 7B, a first housing 701 includes an upper surface 7011 which forms the exterior of the electronic device 200 and a first assembling area 7012 extended from the upper surface 7011 and in contact with a second assembling area 7021 of a second housing 702. When the first housing 701 and the second housing 702 are assembled, the first assembling area 7012 and the second assembling area 7021 are in contact with each other, but are not exposed as the exterior of the electronic device 700.

According to an embodiment of the present disclosure, an internally-concave protrusion accommodating recess 7013 may be formed in the first assembling area 7012 in a direction (e.g., an x-axis direction) in which a hooking protrusion 7022 is placed. According to an embodiment of the present disclosure, the protrusion accommodating recess 7013 may be formed with a depth sufficient to accommodate the hooking protrusion 7022. According to an embodiment of the present disclosure, a first contact area 7014 may be formed in the protrusion accommodating recess 7013. The first contact area 7014 may be partially in contact with a second contact area 7023 of the hooking protrusion 7022. According to an embodiment of the present disclosure, a recess 7015 for accommodating the contact protrusion 7024 formed in the hooking protrusion 7022 of the second housing 702 may be formed in the first contact area 7014 in a matching manner. A plurality of recesses 7015 and a plurality of contact protrusions 7024 may exist.

According to an embodiment of the present disclosure, when the second housing 702 is assembled with the first housing 701, the second assembling area 7021 is matched to the first assembling area 7012 of the first housing 701. According to an embodiment of the present disclosure, the hooking protrusion 7022 may be formed in the second assembling area 7021 in a protruding manner. According to an embodiment of the present disclosure, the hooking protrusion 7022 may be formed in the second contact area 7023 at a location corresponding to the first contact area 7014 of the first housing 701.

According to an embodiment of the present disclosure, a contact protrusion 7024 may be formed to the second contact area 7023 in a protruding manner with a specific interval. The contact protrusion 7024 may be formed to have a curved shape in which an end portion thereof is curved, and may be formed to have a length in a placement direction. However, the present disclosure is not limited thereto, and thus the contact protrusion 7024 may also be formed such that a cross-section thereof has a trapezoidal shape as shown in FIG. 5.

Figure 7C:
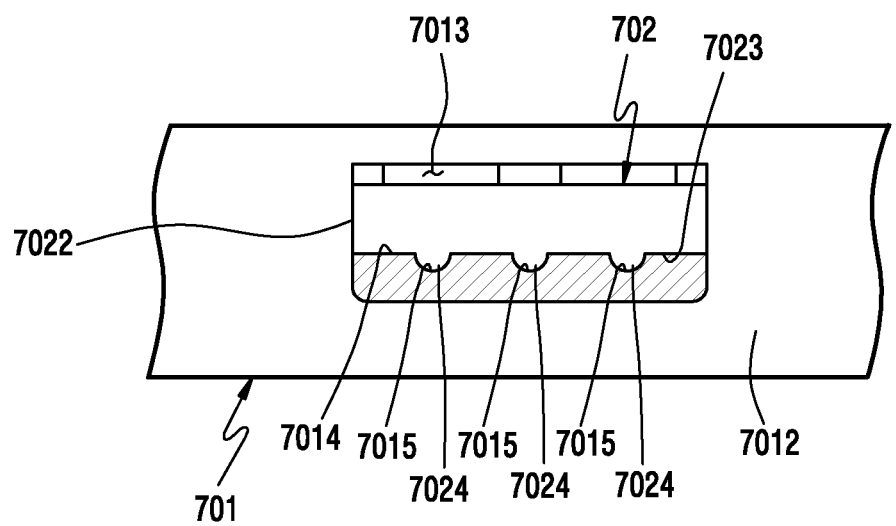
FIG. 7C is a cross-sectional view illustrating a state in which a first housing and a second housing are assembled according to an embodiment of the present disclosure.

FIG. 7C is a cross-sectional view illustrating a state in which the first housing 701 and the second housing 702 are assembled according to an embodiment of the present disclosure.

Referring to FIG. 7C, if the first housing 701 is assembled with the second housing 702, the hooking protrusion 7022 of the second housing 702 may be mounted to the protrusion accommodating recess 7013 of the first housing 701. According to an embodiment of the present disclosure, if the hooking protrusion 7022 is mounted to the protrusion accommodating recess 7013, the first assembling area 7012 of the first housing 701 may be in contact with the second assembling area 7021 of the second housing 702. According to an embodiment of the present disclosure, the second contact area 7023 of the hooking protrusion 7022 of the second housing 702 may be placed to face the first contact area 7014 of the protrusion accommodating recess 7013 of the first housing 702. In this case, the contact protrusion 7024 formed in the second housing 702 is assembled in a manner of mounting to a recess 7015 formed in the protrusion accommodating recess 7013 of the first housing 701, and thus the first contact area 7014 and the second contact area 7023 may be in contact with each other.

According to an embodiment of the present disclosure, an area contact is made between the first contact area 7014 of the first housing 701 and the second contact area 7023 of the second housing 702, and the plurality of the contact protrusion 7024 are mounted to the corresponding plurality of the recess 7015 of the protrusion accommodating recess 7013. In this manner, sliding between the first housing 701 and the second housing 702 may be prevented, or misalignment between the first housing 701 and the second housing 702 caused by an external force (e.g., distortion, etc.) applied to the electronic device 200 may be prevented.

According to an embodiment of the present disclosure, portions in contact with each other in the hooking protrusion 7022 and the protrusion accommodating recess 7013 are described and explained as one portion. However, the present disclosure is not limited thereto. For example, the hooking protrusion 7022 may be formed in a plurality of contact areas in which an outer surface of the hooking protrusion 7022 is in contact with an inner surface of the protrusion accommodating recess 7013.

According to an embodiment of the present disclosure, the protrusion accommodating recess 7013 is formed in the first housing 701, and the hooking protrusion 7022 is formed in the second housing 702. However, it is also possible that the protrusion accommodating recess 7013 is formed in the second housing 702 and the hooking protrusion 7022 is formed in the first housing 701.

According to an embodiment of the present disclosure, the protrusion accommodating recess 7013 and the hooking protrusion 7022 are alternately formed on the first housing 701, and it is also possible that the hooking protrusion 7022 and the protrusion accommodating recess 7013 are alternately formed at a corresponding location of the second housing 702.

According to an embodiment of the present disclosure, the contact protrusion 7024 and the recess 7015 are alternately formed on the second contact area 7023 of the hooking protrusion 7022, and it is also possible that the recess 7015 and the contact protrusion 7024 are alternately formed at a corresponding location of the first contact area 7014.

Figure 8:
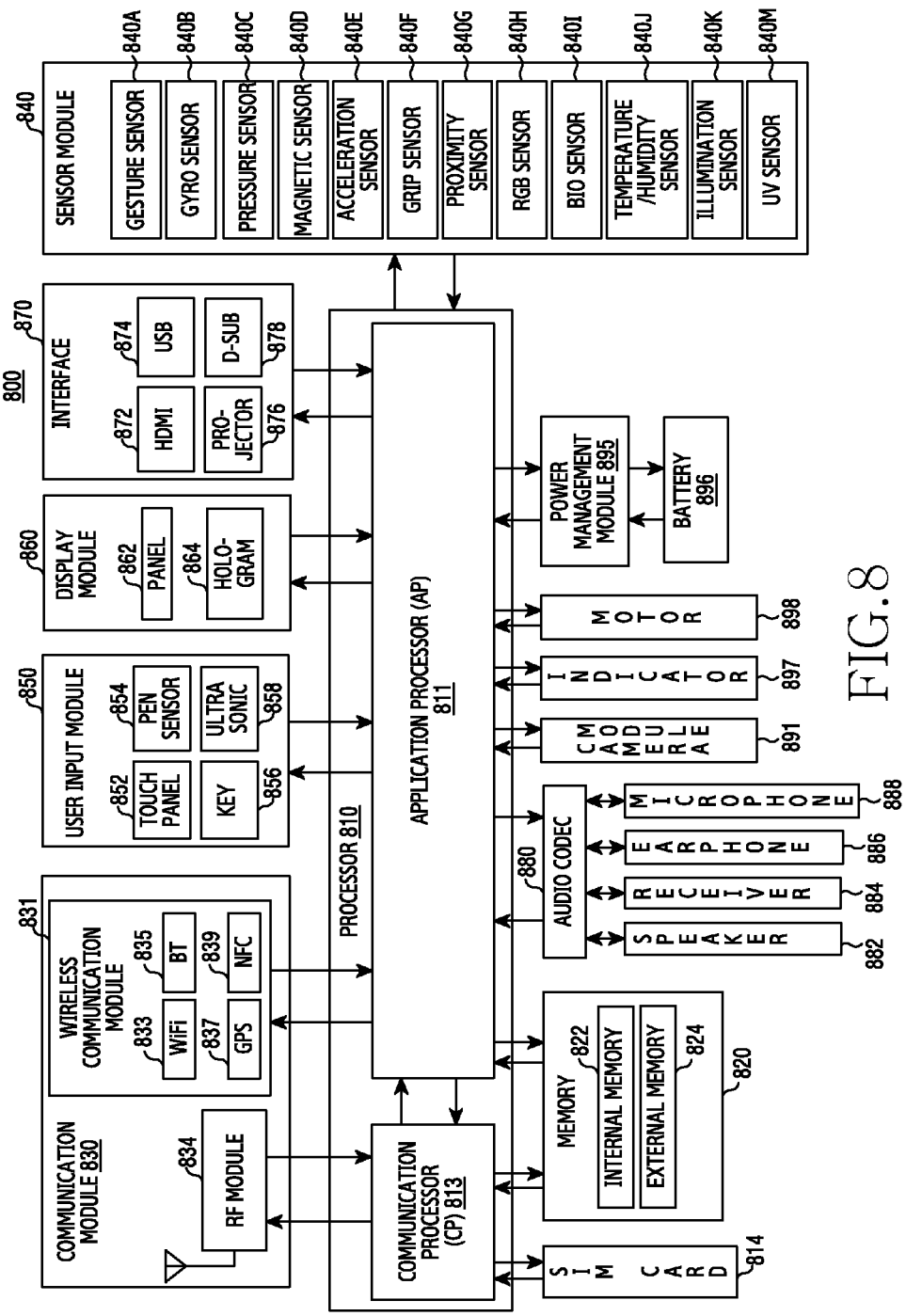
FIG. 8 is a block diagram of a configuration of an electronic device according to an embodiment of the present disclosure.

FIG. 8 is a block diagram of an electronic device according to an embodiment of the present disclosure.

The electronic device 800 may be, for example, the electronic device 101 of FIG. 1. Referring to FIG. 8, the electronic device 800 may include one or more processors 810, a Subscriber Identity Module (SIM) card 814, a memory 820, a communication module 830, a sensor module 840, a user input module 850, a display module 860, an interface 870, an audio codec 880, a camera module 891, a power management module 895, a battery 896, an indicator 897, and a motor 898.

The processor 810 (e.g., the processor 120) may include one or more Application Processor (APs) 811 and one or more Communication Processors (CPs) 813. While the AP 811 and the CP 813 are included in the processor 810 of FIG. 8, the AP 811 and the CP 813 may be included in different Integrated Circuit (IC) packages. The AP 811 and the CP 813 may be included in the single IC package.

The AP 811 controls hardware or software components connected to the AP 811 by driving an operating system or an application program, and carries out data processing and operations including multimedia data. The AP 811 may be implemented using, for example, a System on Chip (SoC). The processor 810 may further include a Graphic Processing Unit (GPU).

The CP 813 manages data links and converts the communication protocol in the communications between the electronic device 800 and the other electronic devices connected over the network. The CP 813 may be implemented using, for example, an SoC. The CP 813 performs at least part of a multimedia control function. The CP 813 identifies and authenticates the electronic device in the communication network using the SIM card 814. The CP 813 provides the user with services including voice call, video call, text message, and packet data.

The CP 813 controls the data transmission and reception of the communication module 830. While the components of the CP 813, the power management module 895, and the memory 820 are separated from the AP 811 in FIG. 8, the AP 811 may include part (e.g., the CP 813) of such components.

The CP 813 may be the processor 120 of FIG. 1.

The AP 811 or the CP 813 loads and processes the instruction or the data received from at least one of its non-volatile memory and the other component, in a volatile memory. The 811 AP or the CP 813 stores data received from or generated by at least one of the other components, to the non-volatile memory.

The SIM card 814 may be inserted to a slot formed at a specific location of the electronic device. The SIM card 814 may contain unique identification information (e.g., Integrated Circuit Card Identifier (ICCID)) or subscriber information (e.g., International Mobile Subscriber Identity (IMSI)).

The memory 820 may include an internal memory 822 and an external memory 824. The memory 820 may be, for example, the memory 130 of FIG. 1. The internal memory 822 may include at least one of, for example, the volatile memory (e.g., Dynamic Random Access Memory (RAM) (DRAM), Static RAM (SRAM), Synchronous DRAM (SDRAM)) and the non-volatile memory (e.g., One-Time Programmable Read Only Memory (ROM) (OTPROM), Programmable ROM (PROM), Erasable PROM (EPROM), Electrically EPROM (EEPROM), mask ROM, flash ROM, NAND flash memory, NOR flash memory). The internal memory 822 may employ a Solid State Drive (SSD). The external memory 824 may further include, for example, a Compact Flash (CF), a Secure Digital (SD), a Micro-SD, a Mini-SD, an extreme digital (xD), and a memory stick.

The communication module 830 may include a wireless communication module 831 and a Radio Frequency (RF) module 834. For example, the communication module 830 may be the communication module 160 of FIG. 1. For example, the wireless communication module 831 may include a Wi-Fi 833, a BT 835, a UPS 837, and an NFC 839. For example, the wireless communication module 831 may provide a wireless communication function using a radio frequency. Alternatively, the wireless communication module 831 may include a network interface (e.g., Local Area Network (LAN) card) or a modem for connecting the electronic device 800 to the network (e.g., Internet, LAN, Wide Area Network (WAN), telecommunication network, cellular network, satellite network, or POTS).

The RF module 834 controls the data transmission and reception, for example, the transmission and reception of the RE signal or the paged electric signal. For example, the RF module 834 may include a transceiver, a Pulse Amplitude Module (PAM), a frequency filter, or a Low Noise Amplifier (LNA). The RF module 834 may further include a component, for example, conductor or conducting wire, for sending and receiving electromagnetic waves in a free space during the wireless communication.

The sensor module 840 may include at least one of, for example, a gesture sensor 840A, a gyro sensor 840B, an atmospheric pressure sensor 840C, a magnetic sensor 840D, an acceleration sensor 840E, a grip sensor 840F, a proximity sensor 840G, a Red Green Blue (RUB) sensor 840H, a biometric sensor 840I, a temperature/humidity sensor 840J, a light (illumination) sensor 840K, and an UltraViolet (UV) sensor 840M. The sensor module 840 measured a physical quantity or detected the operation status of the electronic device, and converted the measured or detected information to an electric signal. Alternatively, the sensor module 840 may include, for example, an E-noise sensor, an electromyography (EMG) sensor, an electroencephalogram (EEG) sensor, an electrocardiogram (ECG) sensor, or a finger print sensor. The sensor module 840 may further include a control circuit for controlling its one or more sensors.

The user input module 850 may include a touch panel 852, a (digital) pen sensor 854, a key 856, and an ultrasonic input device 858. For example, the touch panel 852 may recognize the touch input using at least one of capacitive, resistive, infrared, and Surface Acoustic Wave (SAW) techniques. The touch panel 852 may further include a controller. The capacitive touch panel may recognize not only the direct touch but also the proximity. The touch panel 852 may further include a tactile layer. In this case, the touch panel 852 may provide a tactile response to the user.

The (digital) pen sensor 854 may be implemented using, for example, the same or similar method as or to the user's touch input, or using a separate recognition sheet. For example, the key 856 may include a keypad or a touch key. The ultrasonic input device 858, which obtains data by detecting microwave through a microphone 8108 in the electronic device, allows radio frequency identification through the pen which generates an ultrasonic signal. The electronic device 800 may receive the user input from an external device (e.g., a network, a computer, a server) connected using the communication module 830.

The display module 860 may include a panel 862 or a hologram 864. The panel 862 may employ, for example, a Liquid Crystal Display (LCD) or an Active Matrix Organic Light Emitting Diode (AMOLED). The panel 862 may be implemented, for example, flexibly, transparently, or wearably. The panel 862 may be constructed as the single module with the touch panel 852. The hologram 864 presents a three-dimensional image in the air using interference of light. The display module 860 may further include a control circuit for controlling the panel 862 or the hologram 864.

The interface 870 may include, for example, a High Definition Multimedia interface (HDMI) 872, a Universal Serial Bus (USB) 874, a projector 876, and a D-subminiature (D-sub) 878. Alternatively, the interface 870 may include, for example, a SD/Multi-Media Card (MMC) or Infrared Data Association (IrDA).

The audio codec 880 converts the voice to an electric signal and vice versa. For example, the audio codec 880 may convert voice information which is input or output through, for example, a speaker 882, a receiver 884, an earphone 886, or the microphone 888.

The camera module 891 captures a still picture and a moving picture, and may include one or more image sensors (e.g., front lens or rear lens), an Image Signal Processor (ISP), or a flash Light Emitting Diode (LED).

The power management module 895 manages power of the electronic device 800. For example, the power management module 895 may include a Power Management IC (PMIC), a charger IC, or a battery gauge.

The PMIC may be mounted in, for example, an IC or a SoC conductor. The charging type may be divided to a wired type and a wireless type. The charger IC charges the battery and prevents overvoltage or overcurrent from flowing from the charger. The charger IC may include a charger IC for at least one of the wired charging type or the wireless charging type. The wireless charging type may include, for example, magnetic resonance, magnetic induction, and microwave, and may further include an additional circuit, for example, coil loop, resonance circuit, rectifier circuit, for the wireless charging.

The battery gauge may measure, for example, the remaining capacity of the battery 896 and the voltage, the current, or the temperature of the charging. The battery 896 supplies the power by generating the electricity. For example, the battery 896 may be a rechargeable battery.

The indicator 897 displays a specific status, for example, booting state, message state, or charging state of the electronic device 800 or part (e.g., AP 811) of the electronic device 800. The motor 898 converts the electric signal to a mechanic vibration.

Although not depicted here, the electronic device 800 may further include a processor (e.g., CPU) for supporting mobile TV. For example, the processor for supporting the mobile TV may process media data in conformity with Digital Multimedia Broadcasting (DMB), Digital Video Broadcasting (DVB), or media flow standard. The aforementioned hardware components may include one or more components, and the names of the corresponding components of the present disclosure may differ according to the type of the electronic device. The hardware of the present disclosure may include at least one of the components, omit some components, or further include other components. Some of the hardware components may be united to the single entity to carry out the same functions of the corresponding components.

Each of the aforementioned constitutional elements of the electronic device according to the present disclosure may consist of one or more components, and names thereof may vary depending on a type of electronic device. The electronic device according to the present disclosure may include at least one of the aforementioned constitutional elements. Some of the constitutional elements may be omitted, or additional other constitutional elements may be further included. In addition, some of the constitutional elements of the electronic device according to the present disclosure may be combined and constructed as one entity, so as to equally perform functions of corresponding constitutional elements before combination.

According to an embodiment, at least some parts of a device (e.g., modules or functions thereof) or method (e.g., operations) of the present disclosure may be implemented with an instruction stored in a non-transitory computer-readable storage media for example. If the instruction is executed by one or more processors (e.g., the processor 120), the one or more processors may perform a function corresponding to the instruction. The non-transitory computer-readable storage media may be, for example, the memory 130. At least some parts of the programming module may be implemented (e.g., executed), for example, by the processor 120. At least some parts of the programming module may include modules, programs, routines, sets of instructions, processes, and the like, for performing one or more functions.

The non-transitory computer readable recording medium may be a hardware device configured particularly to store and perform a program instruction (e.g., program module), for example, a hard disk, a magnetic medium such as a floppy disc and a magnetic tape, an optical storage medium such as a Compact Disc-ROM (CD-ROM) or a Digital Versatile Disc (DVD), a magnetic-optic medium such as a floptical disc, an ROM, an RAM, a flash memory, and the like. An example of the program instruction includes not only a machine language created by a compiler but also a high-level language executable by a computer by using an interpreter or the like. The aforementioned hardware device may be configured to operate as one or more software modules to perform the operation of the present disclosure, and the other way around is also possible.

The module or programming module according to the present disclosure may further include at least one or more constitutional elements among the aforementioned constitutional elements, or may omit some of them, or may further include additional other constitutional elements. Operations performed by a module, programming module, or other constitutional elements of the present disclosure may be executed in a sequential, parallel, repetitive, or heuristic manner. In addition, some of the operations may be executed in a different order or may be omitted, or other operations may be added.

According to various embodiments of the present disclosure, in a storage medium having instructions stored therein, when the instructions are executed by at least one processor, the processor is configured to perform at least one operation.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure is defined not by the detailed description of the present disclosure but by the appended claims, and all differences within the scope will be construed as being included in the present disclosure.

What is claimed is:

1. A housing assembly comprising:
a first housing with a display surface;
a second housing assembled with the first housing;
a protrusion accommodating recess formed in the first housing, the protrusion accommodating recess having a first planar contact surface perpendicular to the display surface;
a hooking protrusion formed in the second housing to be accommodated in the protrusion accommodating recess, the hooking protrusion having a second planar contact surface opposite to the first planar contact surface, the second planar contact surface having a length in a direction parallel to the display surface and a width; and
at least one rounded contact protrusion formed across the width of the second planar contact surface of the hooking protrusion,
wherein the hooking protrusion is assembled with the protrusion accommodating recess in a hooking manner, and wherein when the hooking protrusion is accommodated in the protrusion accommodating recess, the at least one rounded contact protrusion is engaged with the first planar contact surface of the protrusion accommodating recess by frictional forces so as to separate the first planar contact surface and the second planar contact surface from each other.

2. The housing assembly of claim 1, wherein the at least one contact protrusion is formed to have a length in a same direction with the hooking protrusion.

3. The housing assembly of claim 1, wherein a portion of the at least one contact protrusion in contact with the inner surface of the protrusion accommodating recess is formed as a curved surface.

4. The housing assembly of claim 1, wherein a line contact or a point contact is made between the hooking protrusion and the protrusion accommodating recess.

5. The housing assembly of claim 1, wherein the first housing and the second housing are assembled as a case housing of an electronic device.

6. The housing assembly of claim 1, wherein one of the first housing and the second housing is applied as a case housing of an electronic device, and the remaining one housing is applied as a battery cover assembled to the case housing in a detachable manner.

7. An electronic device comprising:
a front housing with a display surface applied to an exterior of the electronic device;
a rear housing applied to the exterior of the electronic device and assembled with the front housing;
a plurality of protrusion accommodating recesses formed in an assembling area with respect to the rear housing with a specific interval around an edge of the front housing, each of the plurality of protrusion accommodating recesses having a first planar contact surface perpendicular to the display surface;
a hooking protrusion formed in the assembling area with respect to the front housing around an edge of the rear housing to be accommodated in the plurality of protrusion accommodating recesses, the hooking protrusion having a second planar contact surface opposite to the first planar contact surface, the second planar contact surface having a length in a direction parallel to the display surface and a width; and
at least one rounded contact protrusion formed across the width of the second planar contact surface of the hooking protrusion,
wherein the hooking protrusion is assembled with the protrusion accommodating recesses in a hooking manner, and
wherein when the hooking protrusion is accommodated in the plurality of protrusion accommodating recesses, the at least one rounded contact protrusion is engaged with the first planar contact surface of the plurality of protrusion accommodating recesses by frictional forces so as to separate the first planar contact surface and the second planar contact surface from each other.

8. The electronic device of claim 7, wherein a line contact or a point contact is made between the at least one contact protrusion and the plurality of protrusion accommodating recesses.

9. The electronic device of claim 7, wherein a portion of the at least one contact protrusion in contact with the inner surface of the plurality of protrusion accommodating recesses is formed as a curved surface.

10. The electronic device of claim 9, further comprising a display module.

* * * * *

UNITED STATES PATENT AND TRADEMARK OFFICE
CERTIFICATE OF CORRECTION

PATENT NO. : 9,846,457 B2  
APPLICATION NO. : 14/695943  
DATED : December 19, 2017  
INVENTOR(S) : Seong-Hyeon Kim et al.

Page 1 of 1

It is certified that error appears in the above-identified patent and that said Letters Patent is hereby corrected as shown below:

In the Claims

In Column 19, Claim 1, Line 6:
"first planar contact surface perpendicular to the display"
Should be:
-- first planar contact surface parallel to the display --

In Column 20, Claim 7, Line 11:
"perpendicular to the display surface;"
Should be:
-- parallel to the display surface; --

Signed and Sealed this
Twenty-seventh Day of August, 2019

Andrei Iancu
*Director of the United States Patent and Trademark Office*